US012676565B2

(12) United States Patent
Dinu et al.

(10) Patent No.: US 12,676,565 B2
(45) Date of Patent: Jul. 7, 2026

(54) POSITION CONTROL OF MECHANICALLY PARALLELED ELECTRICAL DRIVES WITHOUT INTERCOMMUNICATION BUSES

(71) Applicant: Hamilton Sundstrand Corporation, Charlotte, NC (US)

(72) Inventors: Andrei Dinu, Leicester (GB); Naison E. Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 261 days.

(21) Appl. No.: 18/507,820

(22) Filed: Nov. 13, 2023

(65) Prior Publication Data

US 2024/0171095 A1 May 23, 2024

(30) Foreign Application Priority Data

Nov. 23, 2022 (EP) ..................................... 22209174

(51) Int. Cl.
*H02P 5/747* (2006.01)
(52) U.S. Cl.
CPC .................................... *H02P 5/747* (2013.01)
(58) Field of Classification Search
CPC .................................... H02P 5/747; H02P 6/00
See application file for complete search history.

(56) References Cited

U.S. PATENT DOCUMENTS

| | | | |
|---|---|---|---|
| 4,600,870 | A | 7/1986 | Martin |
| 8,587,247 | B2 | 11/2013 | Yoshiura et al. |
| 10,338,539 | B1 | 7/2019 | Avritch et al. |
| 2022/0302861 | A1 | 9/2022 | Hogan et al. |

FOREIGN PATENT DOCUMENTS

| | | | |
|---|---|---|---|
| CN | 103269187 B | 8/2015 | |
| CN | 112994531 A * | 6/2021 | ................ H02P 5/50 |
| EP | 3306803 A1 | 4/2018 | |

OTHER PUBLICATIONS

Abstract for CN103269187B, Published: Aug. 12, 2015, 1 page.
Abstract for CN112994531A, Published: Jun. 18, 2021, 1 page.
European Search Report for Application No. 22209174.6, mailed May 12, 2023, 8 pages.
Ruiqing, et al. "The Balanced Current Control of Dual-Redundancy Permanent Magnetic Brushless DC Motor", Electrical Machines and Systems, 2005, ICEMS 2005. Proceedings of the Eighth International Conference on Nanjing, China, Sep. 27-29, 2005, vol. 1, Sep. 27, 2005, pp. 475-479.

* cited by examiner

*Primary Examiner* — Said Bouziane
(74) *Attorney, Agent, or Firm* — CANTOR COLBURN LLP

(57) ABSTRACT

A system includes a mechanical load, a first electrical motor and associated motor drive and a second electrical motor and associated motor drive. The first electrical motor and the second electrical motor being configured to drive the mechanical load in parallel. Each electrical motor and associated motor drive have a respective position sensor configured to measure the output position of the mechanical load; and each motor drive comprises a respective controller configured to output a current demand for its associated motor based on a position error between a desired output position of the mechanical load and the measured output position of the mechanical load from its respective position sensor, and a feedback signal of its output current demand.

9 Claims, 9 Drawing Sheets

POSITION CONTROL OF MECHANICALLY PARALLELED ELECTRICAL DRIVES WITHOUT INTERCOMMUNICATION BUSES

CROSS REFERENCE TO RELATED APPLICATIONS

This application claims priority to European Patent Application No. 22209174.6 filed Nov. 23, 2022, the entire contents of which is incorporated herein by reference.

FIELD

This invention relates to the speed control of mechanically paralleled electrical drives, and specifically, ensuring load balancing between mechanically paralleled electrical drives in position control without the use of intercommunication buses.

BACKGROUND

Typical electromechanical drive systems use a single power converter and a single electrical motor to drive a single mechanical load. However, multiple motors can be used in parallel in order to drive a large load, such as an electric propulsion application, or to provide redundancy when fault tolerance is desired. This may be the case in Design Assurance Level A (DAL A) applications on commercial aircraft, wherein failure of the system may be catastrophic.

Such fault tolerance allows for the system to continue to operate (possibly at reduced performance levels) after a fault has occurred in one part of the system. Detailed product requirements will always define which part of the system is subject to fault tolerance. One way to provide improved fault tolerance is to reduce the amount of single failure points in a system. As mentioned above, fault tolerance may be provided by the use of multiple motors used in parallel. However, in such a case, there is a need to ensure balanced torque production between the motors, as this will not be achieved without further intervention. This is particularly apparent when the motors are position controlled. Torque balancing has been achieved in the past by using intercommunication buses between paralleled motor drive systems. However, such intercommunication buses would reduce the fault tolerance, as the intercommunication bus itself introduces a new single point of failure. Whilst multiple communication buses may be used, it complicates the system architecture. It would be desirable to provide a simple way of providing balanced torque production, whilst reducing the number of single failure points in the system.

SUMMARY

According to a first aspect, there is provided a system comprising a mechanical load, a first electrical motor and associated motor drive and a second electrical motor and associated motor drive. The first electrical motor and the second electrical motor are configured to drive the mechanical load in parallel. Each electrical motor and associated motor drive have a respective position sensor configured to measure the output position of the mechanical load. Each motor drive comprises a respective controller configured to output a current demand for its associated motor drive based on a position error between a desired output position of the mechanical load and the measured output position of the mechanical load from its respective position sensor, and a feedback signal of its output current demand.

Said another way, in the first aspect, the first electrical motor and associated first motor drive have an associated first position sensor configured to measure the output position of the mechanical load. The first motor drive comprises a first controller configured to output a first current demand for the first motor based on a position error between a desired output position of the mechanical load and the measured output position of the mechanical load from the first position sensor, and a feedback signal of the first output current demand. Equally, the second electrical motor and associated second motor drive have an associated second position sensor configured to measure the output position of the mechanical load. The second motor drive comprises a second controller configured to output a second current demand for the second motor based on a position error between a desired output position of the mechanical load and the measured output position of the mechanical load from the second position sensor, and a feedback signal of the second output current demand.

The motor drives therefore utilise a control loop including a "discharge term", which is a feedback loop that depends on the magnitude of the current demand of the respective drive (that is produced by the PI, or other suitable controller). The "discharge term" is subtracted from the error signal before it is processed by the PI controller. The gain of the discharge term is not constant, but rather it is a function of the controller output. The net effect is that the current demands in the two drives will evolve towards closer balance without explicit communication between the two drives, or at least, will not diverge as they typically otherwise would. In addition, such control loops can provide rebalancing following transient faults.

The mechanical load may be a rotary actuator or a linear actuator. For example, the mechanical load may be any load operating in mechanic position control mode such as actuators for flight control surfaces, or variable engine vane actuators.

The feedback signal may comprise a linear function of the output current demand. The feedback signal may comprise a quadratic function of the output current demand. The feedback signal may comprise a cubic function of the output current demand. Equally, the feedback signal may comprise a combination of any of the above functions, and also may include higher order functions. It has been found that higher order functions may provide more balanced load sharing between the motors at higher torques, where at the linear function may provide better load sharing in low torque applications. By combining a number of these functions, it may be possible to provide improved load sharing across all torques.

Each motor drive may further comprise means for varying the feedback signal, thereby allowing for the feedback signal to be varied in use. For example, at low torque operations, it may be that only a linear discharge function is used, and at higher torque operations then other discharge functions can be used.

The system may comprise at least a third electrical motor and associated motor drive configured to drive the mechanical load in parallel with the first and second electrical motors. The third electrical motor and associated motor drive may be configured identically to the first and second motors and their drives. In this way, the third electrical motor and associated third motor drive have an associated third position sensor configured to measure the output position of the mechanical load. The third motor drive comprises a second controller configured to output a third current demand for the third motor based on a position error between a desired output position of the mechanical load and the measured output position of the mechanical load from the third position sensor, and a feedback signal of the third output current demand. The system may be adapted to have any number of paralleled motors.

Each electrical motor and associated motor drive may be configured to drive the mechanical load via a gearbox, or each electrical motor may share a common output shaft.

According to a second aspect, there is provided a method for outputting a current demand to drive an electrical motor of paralleled electric motors driving a mechanical load, the method comprising: receiving a desired position output of the mechanical load, measuring the position output of the mechanical load; calculating a position error between the desired position output of the motor and the measured position output of the motor, and outputting a current demand to drive the motor based on a position error between the desired position of the mechanical load and the measured position of the mechanical load, and a feedback signal of the output current demand.

The mechanical load may be a rotary actuator or a linear actuator.

The feedback signal may comprise a linear function of the output current demand, and/or a quadratic function of the output current demand, and/or a cubic function of the output current demand.

The method may comprise varying the feedback signal.

Each electrical motor may be configured to drive the mechanical load via a gearbox or each motor may share a common output shaft.

BRIEF DESCRIPTION OF THE DRAWINGS

Certain examples of the disclosure will now be described, by way of example only, with reference to the accompanying drawings, in which.

4

Figure 1:
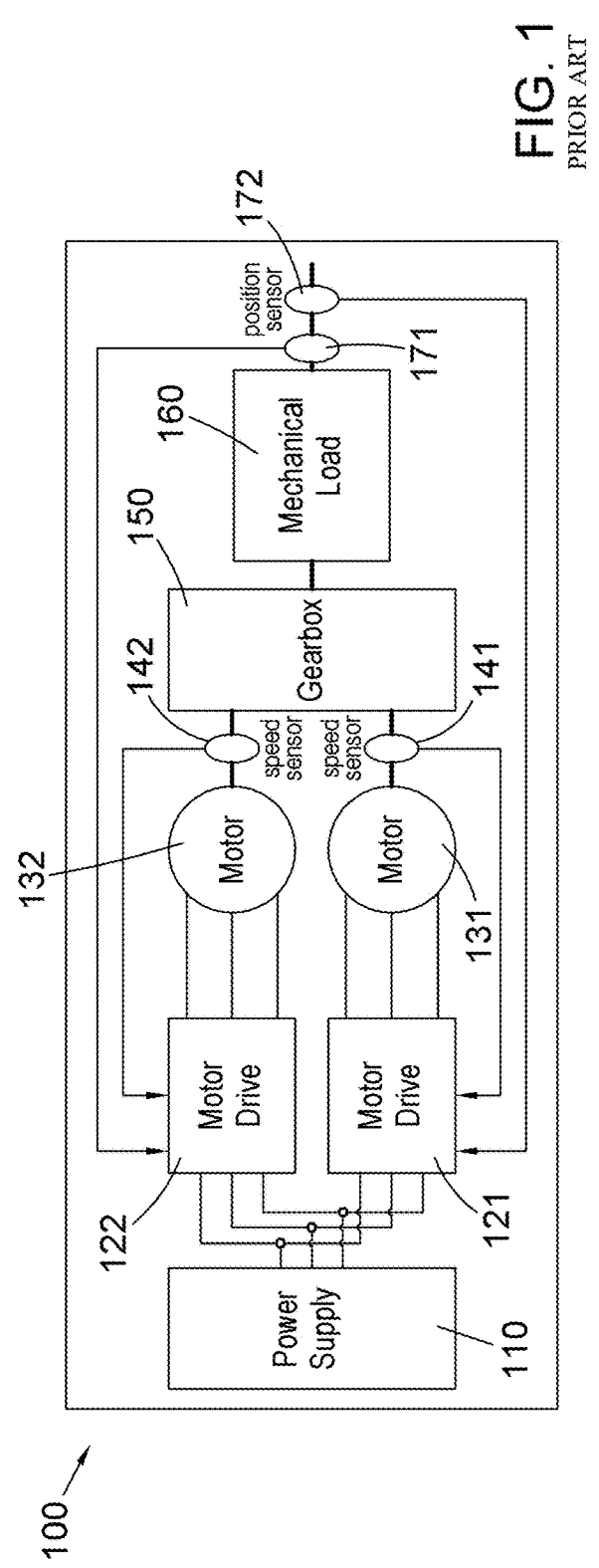
FIG. 1 is a schematic diagram of system with paralleled electric motors configured to drive a common mechanical load in position control.
Figure 3:
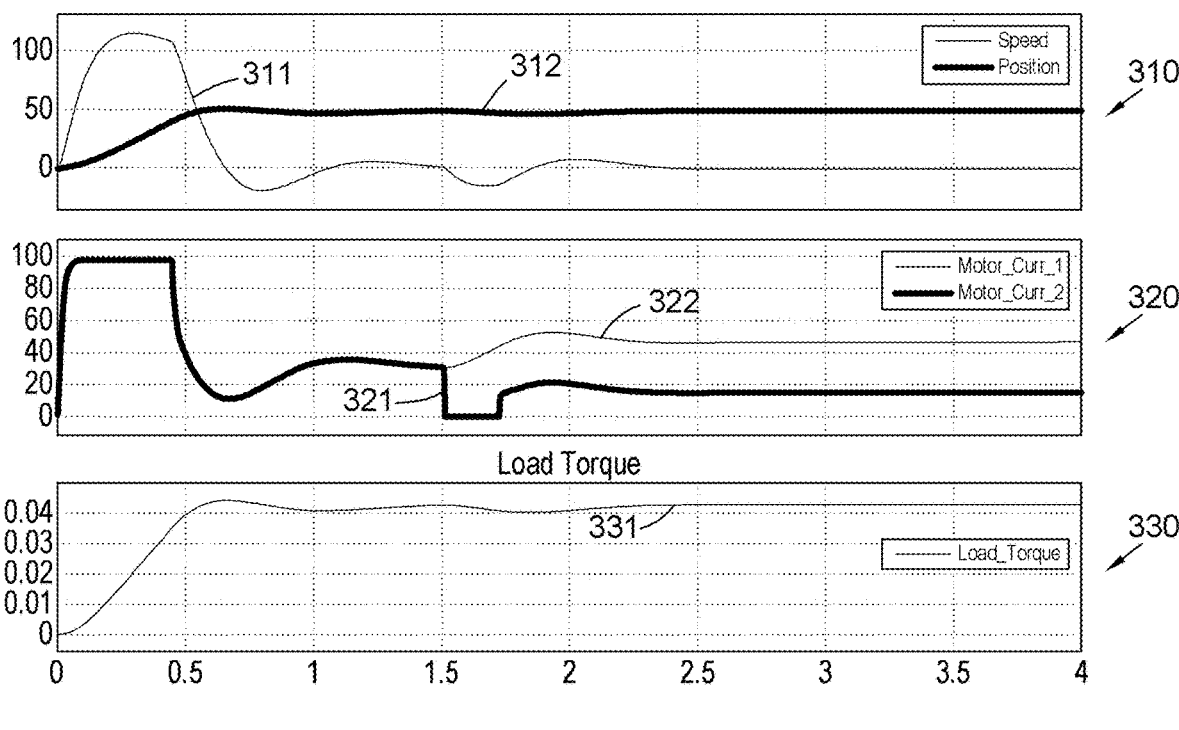
FIG. 3 is a graph showing the results of a simulation of the operation of the system of FIG. 1, and the resulting current imbalance that can result in the current demand of each motor following a temporary failure of one of the motors.
Figure 6:
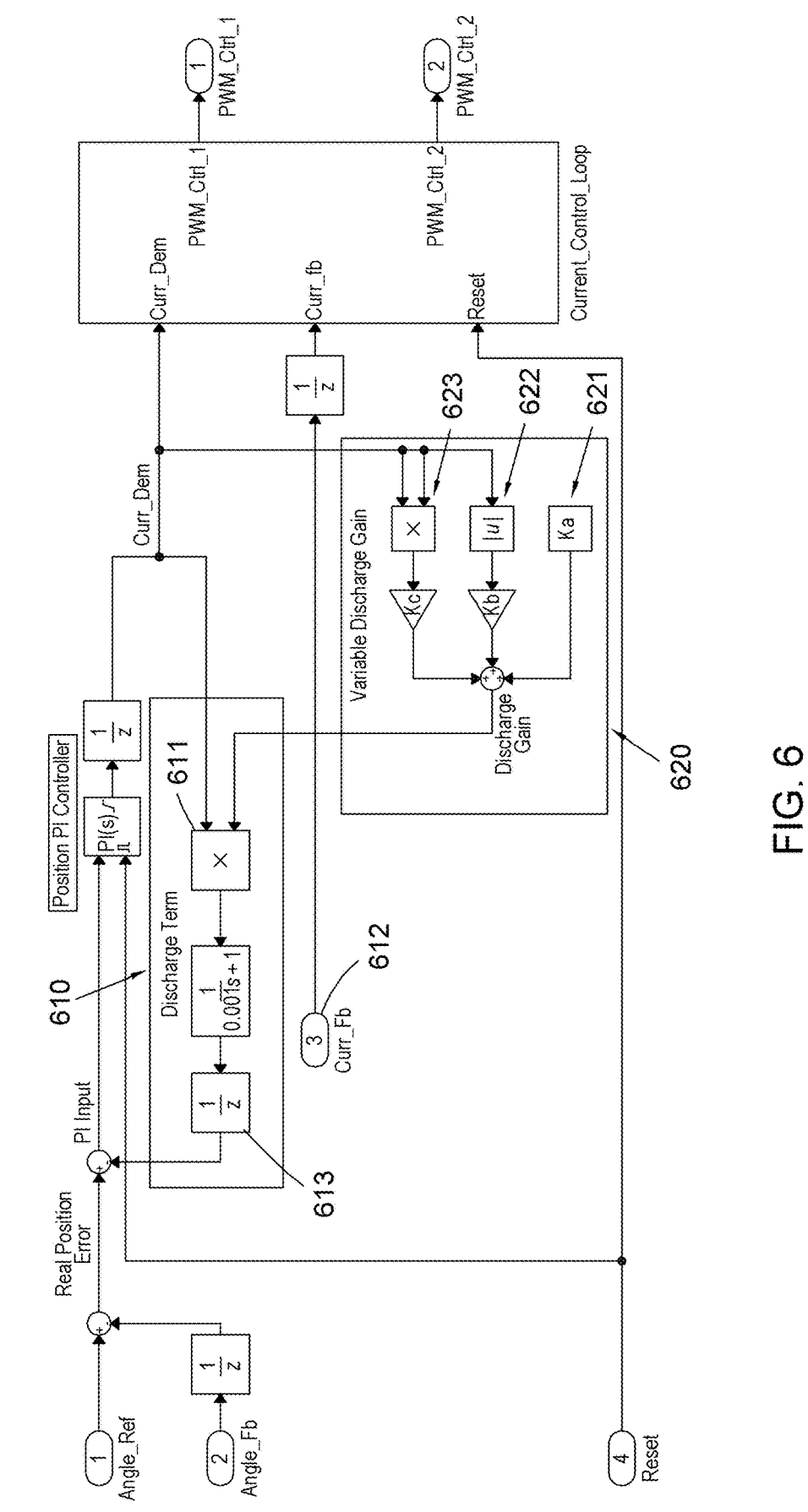
FIG. 6 is a modified control loop that can be implemented within a motor drive to provide improved load sharing.
Figure 8:
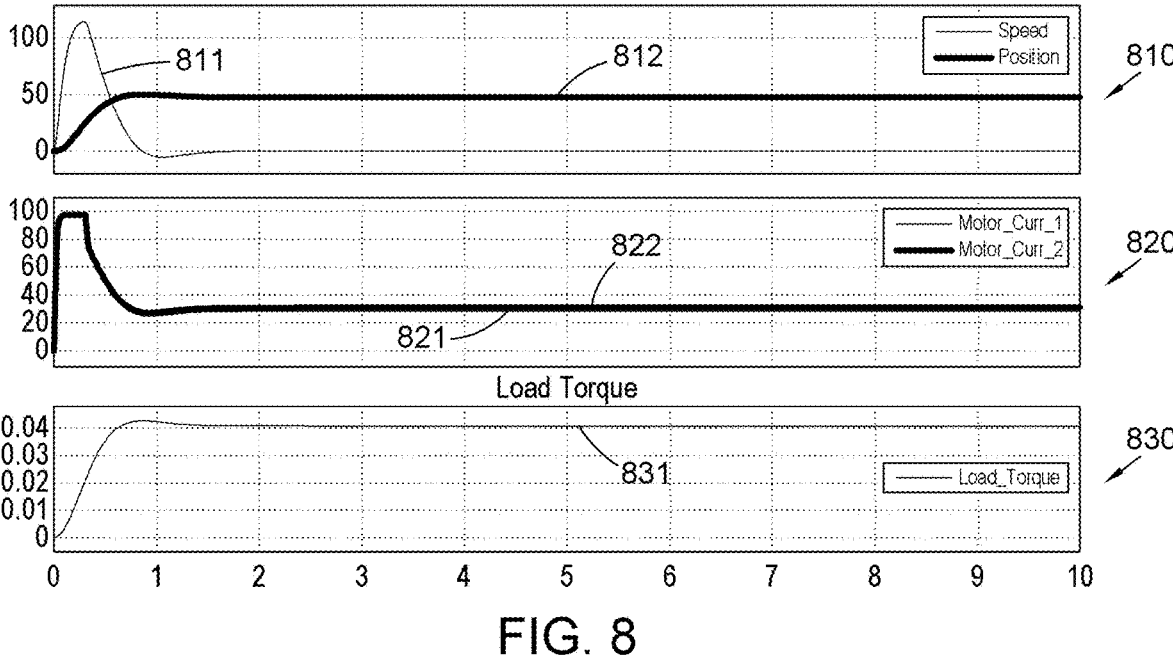
Figure 9:
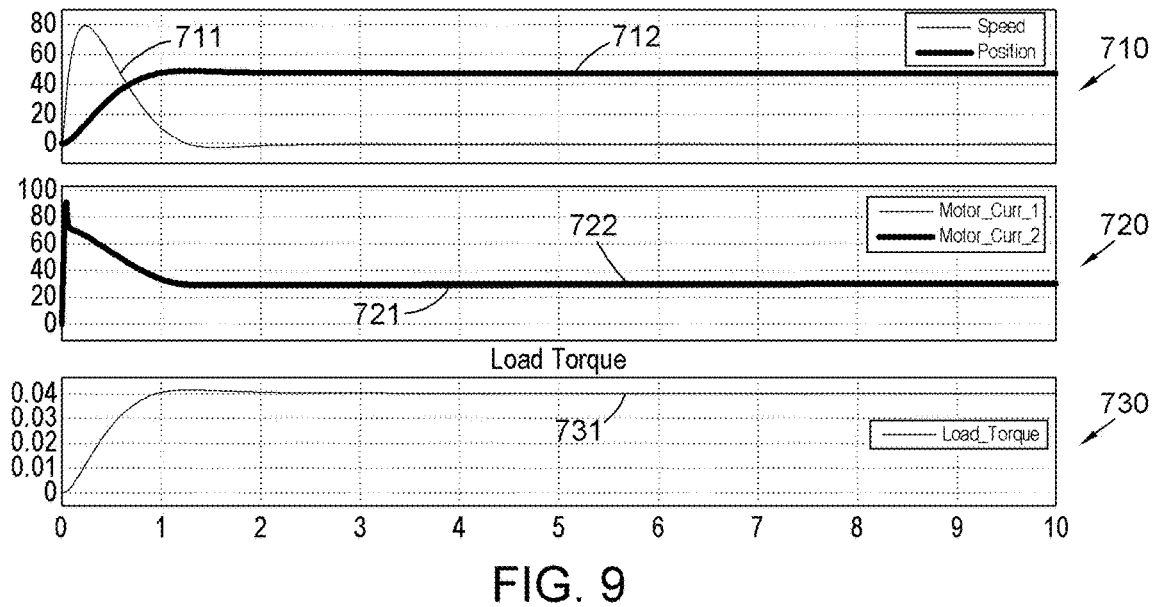
Figure 10:
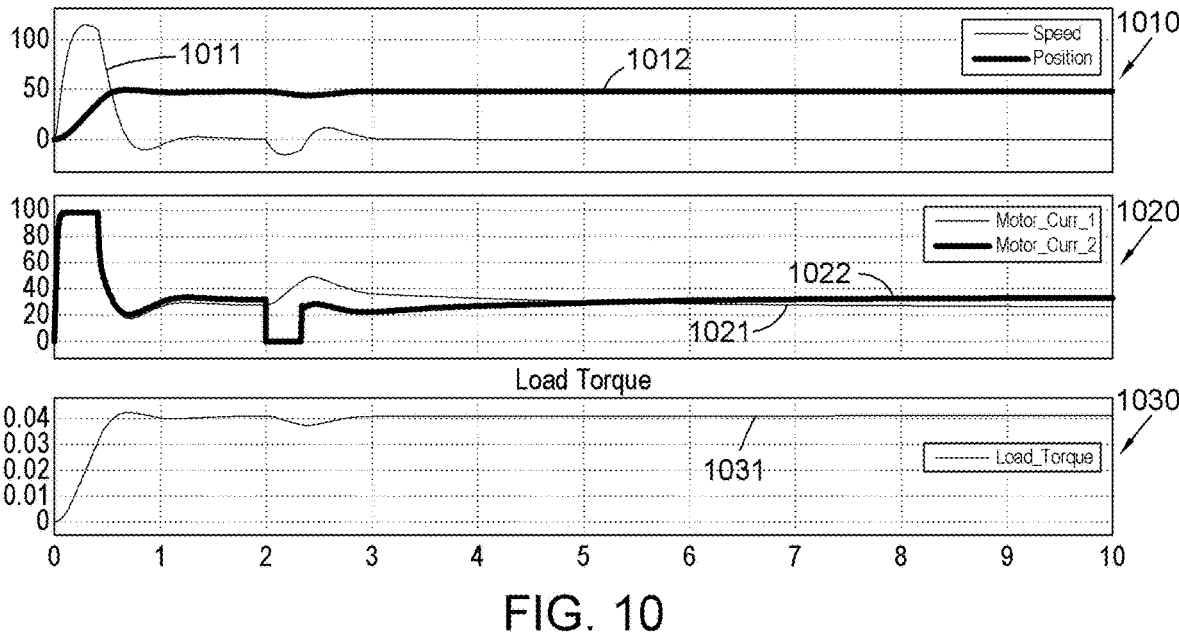
Figure 11:
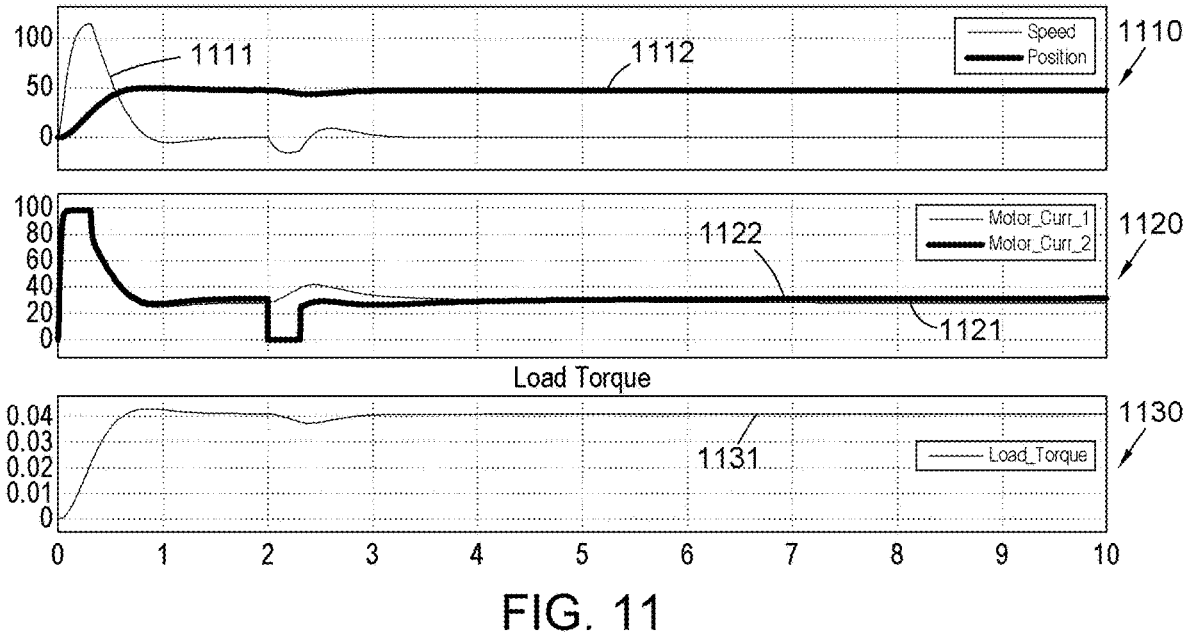
Figure 12:
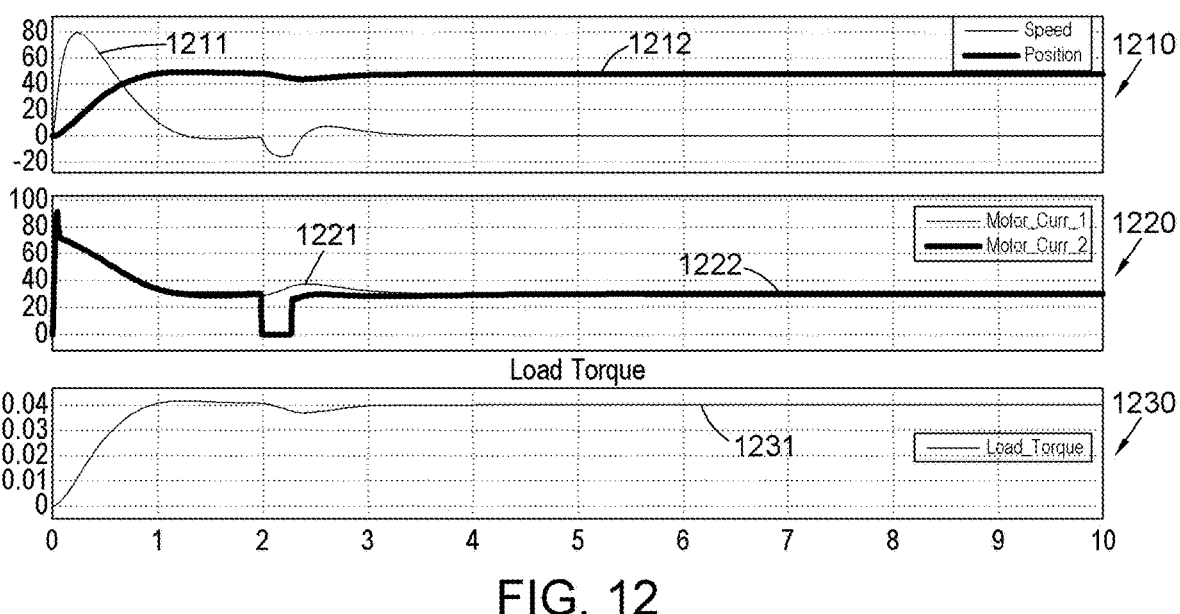
Figure 13:
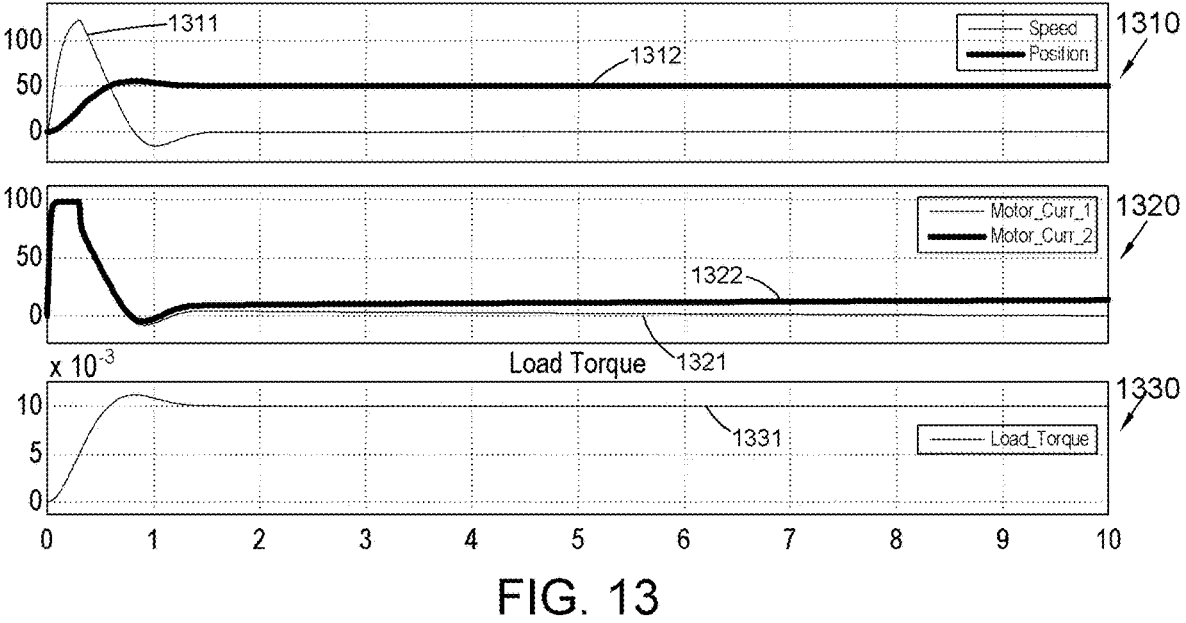
Figure 14:
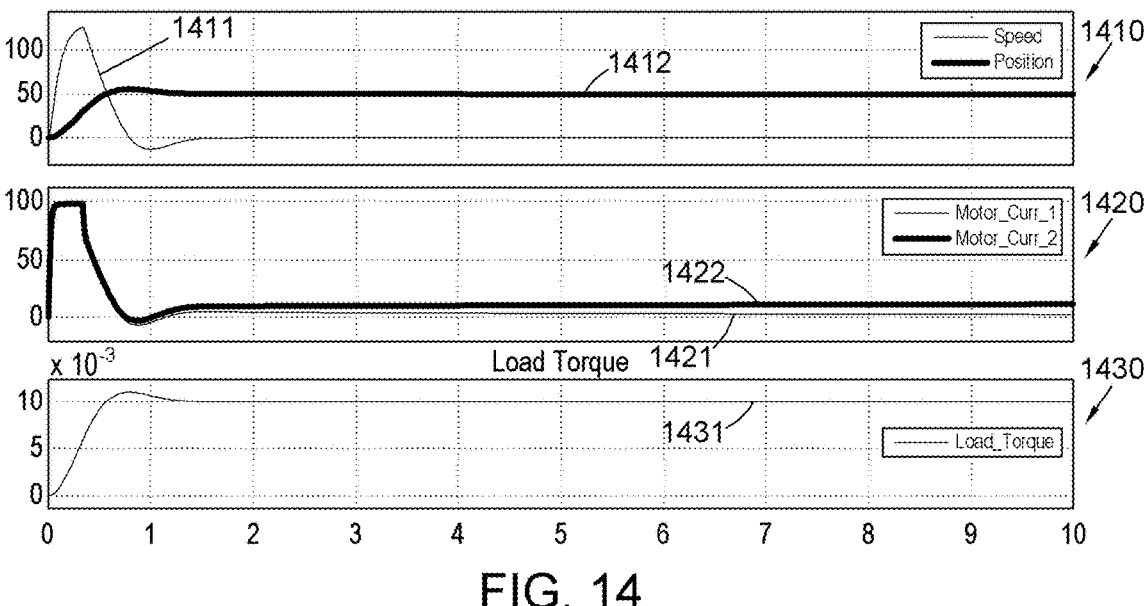
Figure 15:
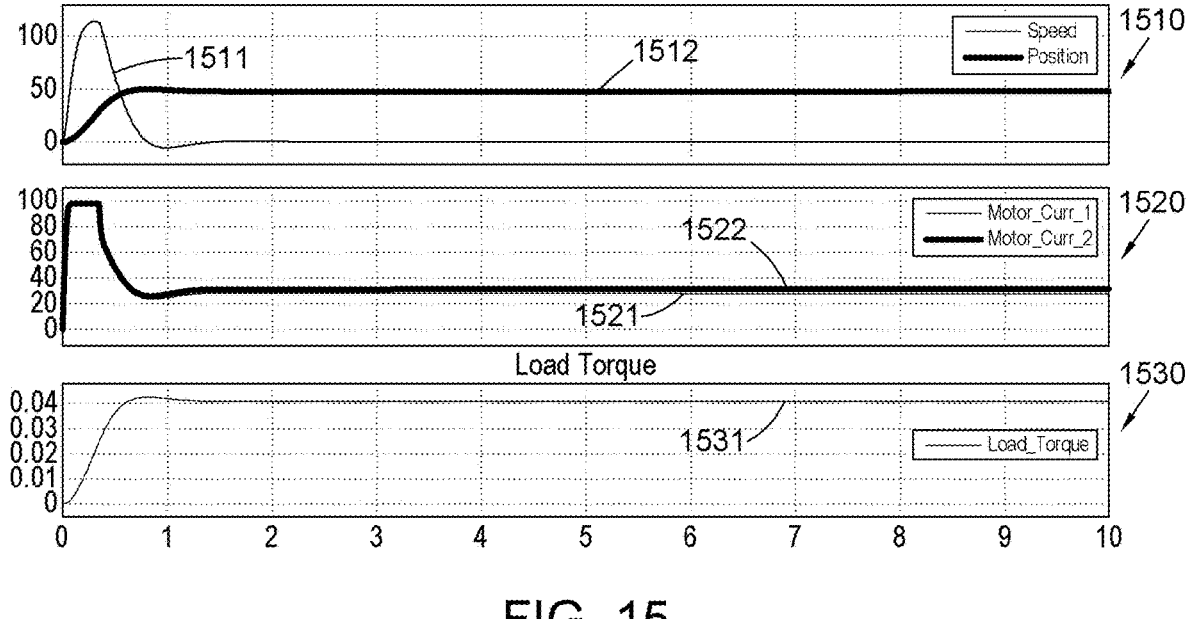

FIG. 8 is a graph showing the results of a simulation of the operation of the system of FIG. 1, wherein the paralleled motor drives utilise a quadratic discharge function from the modified control loop of FIG. 6;

FIG. 9 is a graph showing the results of a simulation of the operation of the system of FIG. 1, wherein the paralleled motor drives utilise a cubic discharge function from the modified control loop of FIG. 6;

FIG. 10 is a graph showing the results of a simulation like that of FIG. 3, wherein the paralleled motor drives utilise a linear discharge function from the modified control loop of FIG. 6;

FIG. 11 is a graph showing the results of a simulation like that of FIG. 3, wherein the paralleled motor drives utilise a quadratic discharge function from the modified control loop of FIG. 6;

FIG. 12 is a graph showing the results of a is a graph showing the results of a simulation like that of FIG. 3, wherein the paralleled motor drives utilise a cubic discharge function from the modified control loop of FIG. 6;

FIG. 13 is a graph showing the results of a simulation of the operation of the system of FIG. 1 at low torque, wherein the paralleled motor drives utilise a quadratic discharge function from the modified control loop of FIG. 6;

FIG. 14 is a graph showing the results of a simulation of the operation of the system of FIG. 1 at low torque, wherein the paralleled motor drives utilise a combination of linear and quadratic discharge functions from the modified control loop of FIG. 6; and FIG. 15 is a graph showing the results of a simulation of the operation of the system of FIG. 1 at higher torques, wherein the paralleled motor drives utilise a combination of linear and quadratic discharge functions from the modified control loop of FIG. 6.

DETAILED DESCRIPTION

Whilst the description herein refers to only two paralleled motors driving a common load, it would be appreciated that the teaching herein could be applied to any number of motors driving a mechanical motor. For example, there could be three or more paralleled motors configured to drive a common load. In addition, whilst the description herein describes a common load that is connected via a gearbox, it will be appreciated that the present invention may find use in other paralleling solutions. For example, rather than the paralleled motors being connected to a gearbox, both motors may share a common shaft. In addition, the mechanical load here is referred to as an actuator, but it would be appreciated that the control here could be applied to any device that is position controlled. Further, whilst mention is made to specific controllers and types of controllers, it would be appreciated that any suitable controller may be used—for example, a PID controller may be used as opposed to a PI controller.

An example of system 100 comprising parallel motors is shown in FIG. 1. The system 100 comprises a power supply 110, paralleled motor drives 121, 122, each driving a respective motor 131, 132. Both motors 131, 132 are connected via respective shafts to a single gearbox 150, which in turn is connected to a mechanical load 160 through another shaft. The output of each motor 131, 132 is measured by a respective speed sensor 141, 142 on their respective shafts. The measured speed output is fed back to its respective motor drive. In addition, the position of the mechanical load 160 is fed back to each of the motor drives by respective position sensors 171, and 172.

Such a system 100 may continue to operate if a fault develops in one of the electrical motor drives 121, 122 or one of the motors 131, 132, but not when the gearbox 150 is affected. In this case, the gearbox 150 is a single point of failure.

Whilst the system 100 of FIG. 1 provides a level of redundancy in the motor drives 121, 122 and motors 131, 132, there is no mechanism that allows for the motors 131, 132 to ensure balanced torque production. Typically, in position control, each of the motor drives 121, 122 operate on the basis of calculating a simple position error between the reference/desired position of the mechanical load (e.g. an actuator) and the position fed back from their respective position sensor 171, 172, inputting this error to a proportional integral (PI) controller (or any suitable controller) in order to modify the current demand of the given motor drive.

Fair torque sharing does not happen naturally, without specific intervention/control. There is a natural tendency of one drive 121, or 122 to demand more current than the other due to differences in the feedback (position) measurements. This is especially apparent in position sensors, as they can be less accurate than speed sensors, depending on sensing technology and on details of their mechanical assembly inside the mechanical load (typically, an actuator). As a result, there will often be a small difference between the readings of independent position sensors, even though they are supposed to be measuring the same physical position. This causes a mismatch between the position errors calculated by mechanically paralleled drives. This means that the two paralleled drives will never (or at least are highly unlikely) to measure zero position error simultaneously.

Figure 2A:
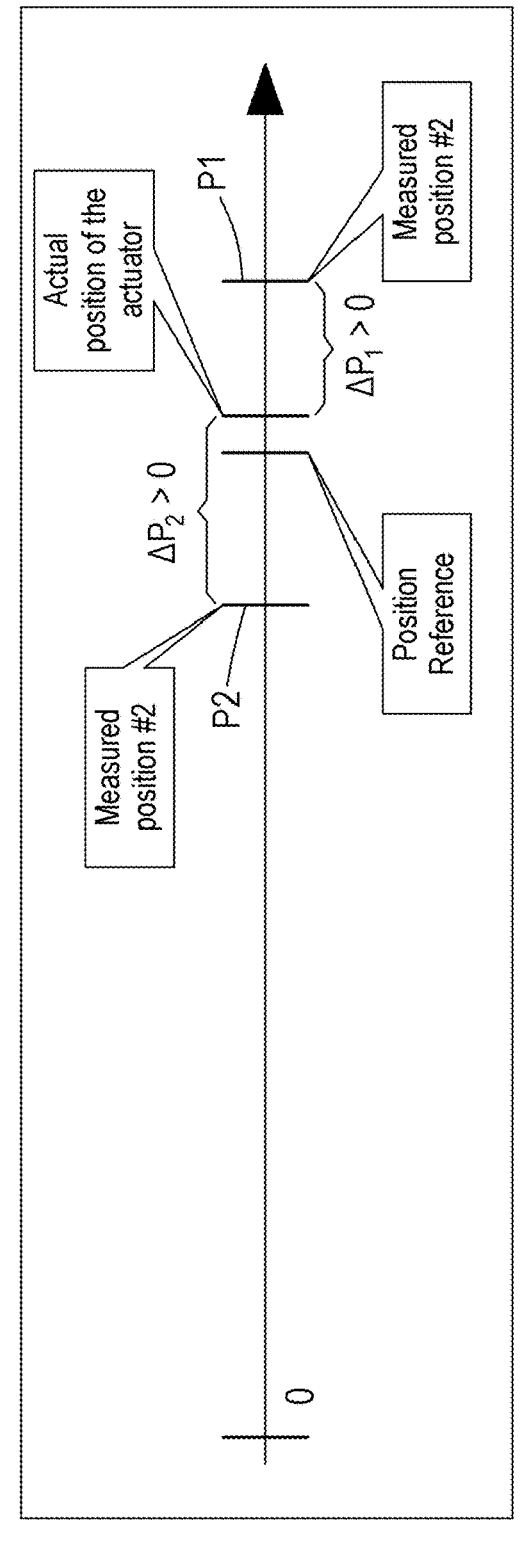
FIG. 2A shows the errors that can arise during position command of paralleled motors.

This is illustrated in FIG. 2A, which shows P1 and P2, the output of each of the position sensors one of the position sensors 171, 172 respectively in measuring the position of the mechanical load 160. The axis represents position. Typically, one position sensor (in this case, sensor 171) will measure a slightly positive error and the other one (in this case, sensor 172) will measure a slightly negative error while the real position of the mechanical load is at the demand/reference value, or close to it.

Specifically an associated error signal is calculated for use in each control loop. Each error signal each calculated by the input reference position, minus the position feedback by its position sensor. However, there is also measurement error $\Delta P$ that is associated with each position sensor. The measurement error is the difference between the correct position feedback (i.e. the "actual" position of the actuator seen in FIG. 2A) and the feedback signal provided by the position sensor, owing to the inaccuracies described above.

As a result, and owing to the inherent position error of each position sensor, motor drive 122 will ramp up its current demand (in order to try and correct its measured position P2 to the demanded position), while the other motor drive 121 will ramp its current demand down (in order to correct its measured position to the demanded position). Whilst as a result, the total torque production is constant, and the controlled position remains unchanged, but the torque imbalance increases until the current limits of the two drives are reached, as seen in the graphs of FIG. 2B.

Figure 2B:
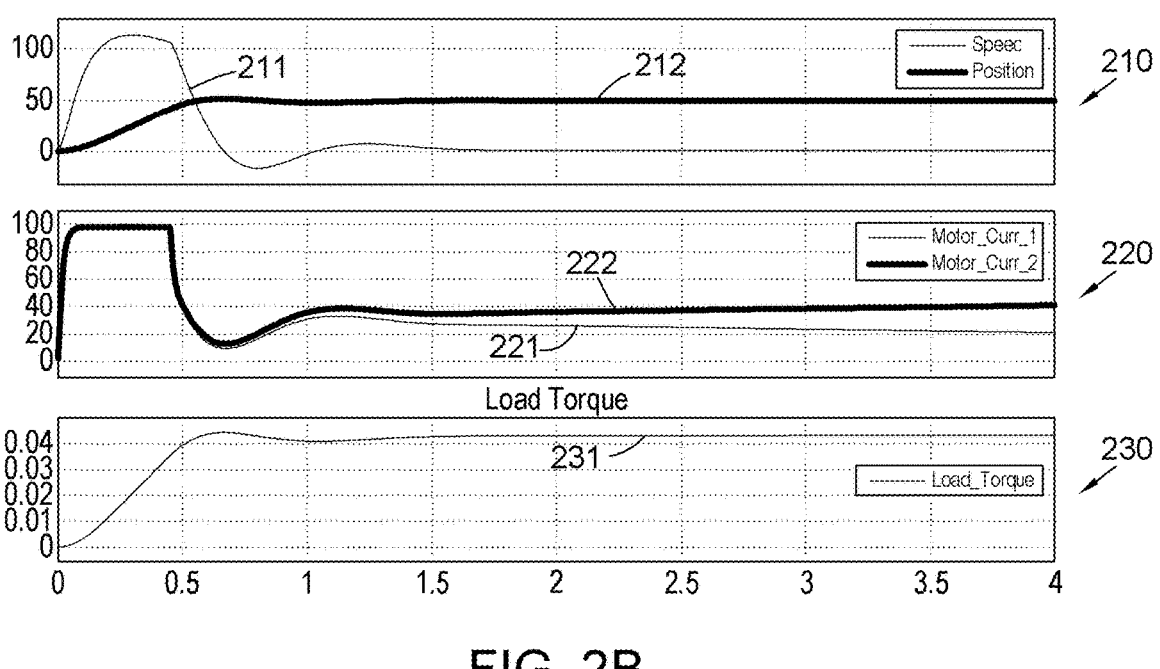
FIG. 2B is a graph showing the results of a simulation of the operation of the system of FIG. 1, and the resulting current imbalance that can result in the current demand of each motor over time owing to measurement errors.

In FIG. 2B, the linear position of a ball screw actuator is considered. In such an example, the linear position of the actuator is proportional to the number of turns executed by the two motors connected to the common gearbox, as seen in FIG. 1. The reference position is equivalent to 50 rad (7.95 motor turns) while the measurement difference is 0.5 rad (1% of the reference value). Each graph is plotted against time on the x axis. At time t=0, the reference position is input into the system.

Graph 210 shows a plot of the speed of the mechanical speed 211 and position 212 of the actuator against time. As can be seen, in response to the position demand, the speed 211 rapidly increases, resulting in a change of position 212. When the desired position is reached, speed reaches to zero, and the actuator remains in position.

Graph 220 shows a plot of the current demand 221 of motor drive 121, and the current demand 222 of motor drive 122 over time. As can be seen, even once the position of the actuator has settled at (or at least near) the reference position, the current demands 221, 222 drift apart. This is because motor drive 121 still sees a positive error in its position, and therefore reduces its current demand 221 to compensate.

However, as motor drive 122 sees a negative error in its position, it increases its current demand 222 in order to compensate.

Graph 230 shows a plot of the resulting load torque 231. As can be seen, this settles at a steady state (like the position of the actuator), despite the uneven (and diverging) individual current demands of the motors. Therefore, even though it externally seems as though the system is operating correctly, there can still be disparity in the current demands of each motor.

Current demand imbalances can also be a problem in the unlikely situation that both position measurements are extremely accurate. One drive may be temporarily disabled by a transient fault such as noise on the communication bus with the aircraft, a single-event upset (SEU) in the digital controller, an overtemperature condition, etc. The temporary loss of one drive will cause loss of overall torque which results in an additional position error. The remaining drive will attempt to correct this by increasing its own current contribution to boost the torque production of the remaining motor, attempting to correct the position of the mechanical load. Even if this may not recover the full operation of the system due to the limited capability of one single drive, even when the disabled drive comes back online it will only have to produce a small amount of current to help the system meet the total torque demand. This is because the first drive is already producing more than 50% of the necessary current.

A simulation of this scenario is shown in FIG. 3, which shows graphs equivalent to FIG. 2B, with like reference numerals indicating like features. The actuator reaches its position reference 32 after power up and motor speed 311 settles at zero while the current demands 321, 322 of the two drives are equal until one of them suffers a temporary failure causing the current to drop to zero. The remaining drive increases its current such that the total torque loss 331 is minimal. When the affected drive recovers functionality, it will only produce the current necessary to cover the torque deficit, but the current will not increase back to the initial value. Of course, whilst FIG. 3 shows a specific example where both position sensors are extremely accurate, the problems caused by an SEU can be exacerbated in the case where the positions sensors are inaccurate, in which case the current imbalance can continue to diverge following the SEU.

Such a current imbalance between the two motor drives 121, 122 is undesirable. For example, a motor drive that consistently has a higher current demand is more likely to overheat, or otherwise fail. A higher torque demand is more likely to result in increased wear of one of the motors, and therefore a higher likelihood of failure in that motor. Specifically, persistently high currents in the motor can cause premature degradation of insulating materials which lead to short-circuit failures. In addition, persistently high currents in the motor drive can lead to thermal stress, which causes the semiconductor power devices to fail, whether that be either short-circuit or open-circuit depending on the type of device.

Typically, in order to address such issues, one of two approaches have been adopted, as illustrated in FIGS. 4A and 4B.

FIG. 4A shows a system that is similar to the system shown in FIG. 1, with like reference numerals indicating like components. However, in the example of FIG. 4A, there are provided communication buses (not labelled) between the paralleled motor drives 421, 422 to exchange information between the drives about the locally calculated current demands. The motor drives 421, 422 can use this information to help balance their loads, for example by using the average of the individual current demands to control their voltage demands and PWM modulation. The failure of a communication bus will not necessarily stop the operation of the receiving drive but will affect its ability to share torque equally with the other drive. In addition, the intercommunication between the motor drives 421 and 422 can introduce its own risks. For example, if a short circuit occurred in one of the motor drives, there is a possibility that the short might be transmitted through one of the communication buses, and potentially cause a failure in the other motor drive, thereby causing complete failure of the system. Additionally, if the system is reliant on such intercommunication buses, then the balanced load sharing is lost when the buses stop working, even if each drive is still functional on its own.

Figures 4, 5:
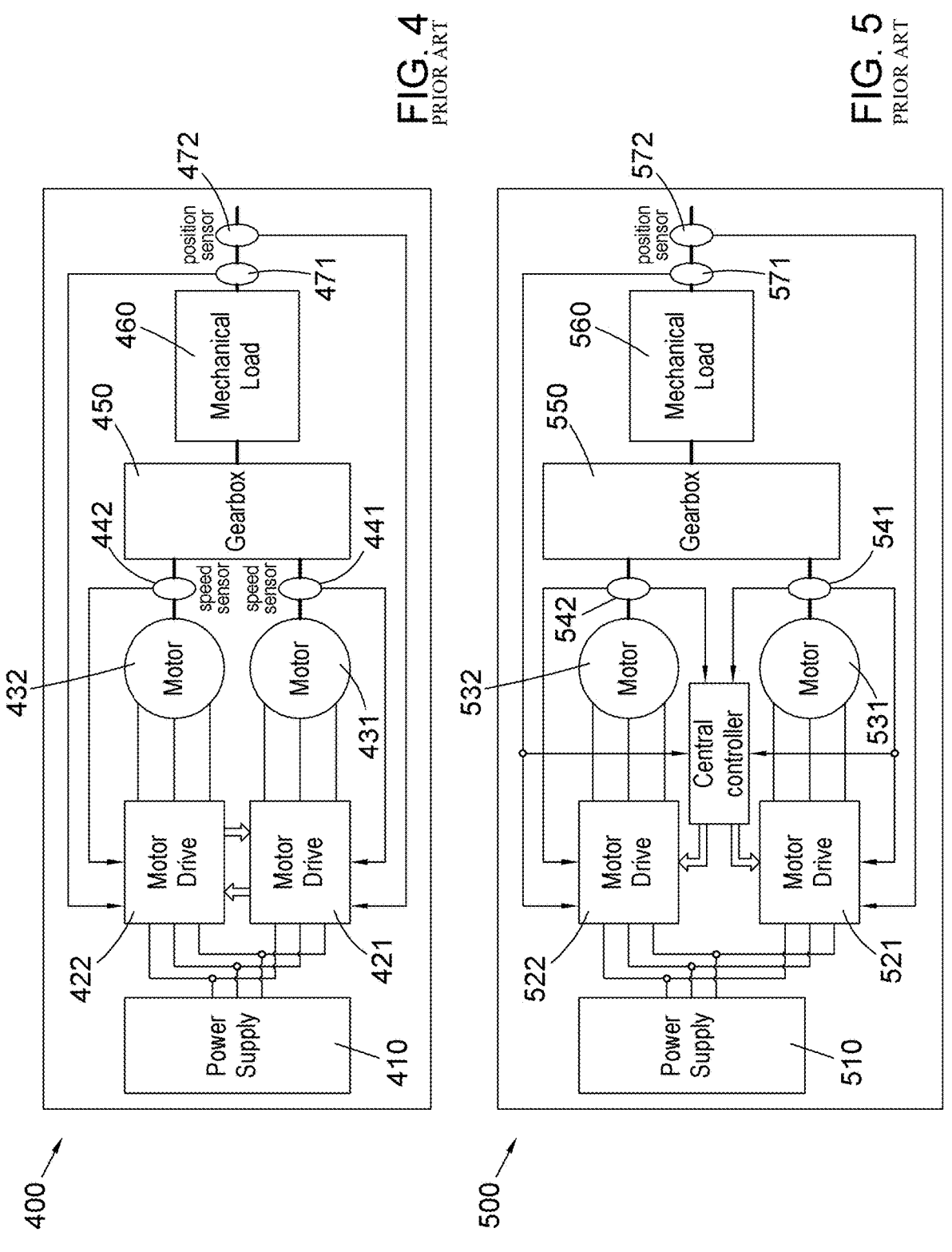
FIG. 4 is a schematic diagram of a system with paralleled electric motors configured to drive a common mechanical load, wherein there are provided communication buses between the motor drives.
FIG. 5 is a schematic diagram of a system with paralleled electric motors configured to drive a common mechanical load, wherein there is provided a central controller that communicates a common current demand to the paralleled drives.

Alternatively, a system 500 has been adopted comprising a central controller 580 that communicates a common current demand to the paralleled drives 521, 522, as shown in FIG. 5. Again, like reference numerals indicate like components to those found in FIG. 1 and FIG. 4. The common current demand would ensure that each motor drive 521 and 522 is balanced. However, such a central controller needs access to the motor speed sensors, and the position sensors, and needs to be implemented using a dual-redundant architecture, so that the central controller 580 itself does not result in a single point of failure. The resulting architecture can therefore be complicated.

There is therefore a need to provide a simplified system and control that can perform automatic torque balancing without increasing the number of single failure points within the system.

For example, the system of FIG. 1 may be provided with a modified control loop which achieves balanced torque production without a dual-redundant central controller and without relying on intercommunication between the drives. Such a control loop is illustrated by the Simulink® model shown in FIG. 6, which may be implemented in a motor drive, such as the paralleled motor drives 121, 122 of FIG. 1.

Previously, as described above, each of the motor drives 121, 122 operate on the basis of calculating a simple speed error between the reference/desired position (Angle_Ref) and the speed fed back (Angle_Fb) from their respective position sensor 171, 172, inputting this error to a proportional integral (PI) controller in order generate the current demand (Current_Dem).

This current demand, along with a feedback signal of the current supplied (Curr_fb) is applied to a current control loop, which calculates the voltage demand and generates PWM signals across outputs 1 and 2 to drive the respective electric motor. The current control loop may be any appropriate current control loop. In addition, whilst the positions above are referred to as angles (i.e. the angle of an output shaft of a motor), it would be appreciated that these could be any suitable position references. For example, in the above discussed case of a ball screw linear actuator, the measured position might be a linear distance, which relates to a certain number of turns of the motor.

Essentially, in FIG. 6, the suggested modified control loop additionally makes use of a "discharge term" 610, which is a feedback loop that depends on the magnitude of the current demand of the respective motor drive (that is produced by the PI, or other suitable controller). The "discharge term" is subtracted from the error signal before it is processed by the PI controller. The gain of the discharge term is not constant, but rather it is a function of the PI controller output (the current demand output Curr_Dem) as shown in FIG. 6. Further, it has been found that an improved response can be achieved in certain situations by modifying the function of the PI controller output, for example, using a variable discharge gain 620 as seen in FIG. 6.

The discharge term 610 will produce a small but negative value at the input of the position PI controller when the system operates at (or nearly at) the demanded position. This steady negative value will "discharge" the PI integrator in a slow and gradual manner. The rate of discharge is proportional to the PI output. Therefore, the integrator of the drive producing a larger current demand will discharge faster than its counterpart in the other drive.

The net effect is that the current demands in the two drives will evolve towards closer towards balance without explicit communication between the two drives. The performance and the limits of the rebalancing discharge term is analysed in the next section. As would be appreciated, FIG. 6 (and the other models described herein) includes unit delay blocks on the feedback signals to avoid circular logic and algebraic loops in the closed loop control system, for the purposes of the Simulink® model.

The main parameters affecting the operation of the paralleled position control loops seen in FIG. 6 are governed by Equation 1:

$$\begin{cases} P_{REF} - P_{FB} - \Delta P_1 - \text{Disc}(I_1) = 0 \\ P_{REF} - P_{FB} - \Delta P_2 - \text{Disc}(I_2) = 0 \end{cases} \qquad \text{Equation 1}$$

Where $P_{REF}$ is the common position reference (i.e. the desired position) received from a higher-level aircraft controller, the local position feedback signal $P_{FB}$ which are each affected by a respective measurement errors $\Delta P_1$ and $\Delta P_2$, as seen in FIG. 2A, and the local respective discharge terms $\text{Disc}(I_1)$ and $\text{Disc}(I_2)$, which are functions of the locally generated current demand, as described above.

The paralleled control loops therefore settle in steady state operation when the total inputs of the PI controllers are zero.

As alluded to above, by modifying the discharge function (the value of Disc(I1) in Equation 1), it is possible to tailor the response of the current demand output by a motor drive, depending on the situation.

The discharge term is calculated at block 611 by taking a product of the current demand (Curr_Dem) and the variable discharge gain 620. The variable discharge gain in FIG. 6 comprises three feedback functions, a constant feedback 621, a linear feedback 622, and a quadratic feedback 623.

In the constant feedback 621, there is applied only a gain, KA. When this is fed into the product block 611 of the discharge term, it results in a linear component of the discharge term 610, i.e. a component that scales linearly with the output current demand.

In the linear feedback 622, a magnitude of the current demand is taken, then scaled by a gain, KB. When this is fed into the product block 611 of the discharge term, it results in a quadratic component of the discharge term 610, i.e. a component that scales with the output current demand with a quadratic relationship.

In the quadratic feedback 623, the current demand is squared, and then scaled by a gain KB. When this is fed into the product block 611 of the discharge term, it results in a cubic component of the discharge term 610, i.e. a component that scales with the output current demand with a cubic relationship.

As would be appreciated, it is anticipated that the variable discharge gain could make use of higher factors of the current demand, such a cubic, quartic or higher. Also, as would be appreciated, in the example of FIG. 6, it is possible to make use of any desired combination of the feedback terms 621, 622, 623 by setting the gain terms KA, KB, and/or KC accordingly. For example, if only constant feedback is required from the variable discharge gain 620 (and therefore a linear feedback from the discharge term owing to product block 611), then KB and KC can be set to zero. Equally, if it is known that, for a certain use, only a certain discharge gain 620 is needed (for example, only a linear feedback in the variable discharge gain 620 so as to only provide a quadratic discharge term), then the discharge gain loop may only comprise linear feedback 622.

For the purposes of the Simulink® model, the discharge term then applies a light touch low pass filter in block 612 to the output of product 611, which may or may not be present in an applied motor drive. There is also applied a unit delay in block 613. The resulting feedback is then subtracted from the calculated position error, and fed to the PI controller to generate the current demand.

The impact of each of the terms of the variable discharge gain 620 are now looked at individually.

Linear Discharge Function

If only a constant discharge gain is used (e.g. if $K_B$ and $K_C$ are set to zero), the discharge function 610 becomes:

$$\text{Disc}(I) = K_A \cdot I \qquad \text{Equation 2}$$

And therefore the resulting steady state conditions become:

$$\begin{cases} P_{REF} - P_{FB} - \Delta P_1 - K_A \cdot I_1 = 0 \\ P_{REF} - P_{FB} - \Delta P_2 - K_A \cdot I_2 = 0 \end{cases} \qquad \text{Equation 3}$$

In this case, the steady-state current imbalance may be calculated by rearranging Equation 3, and is:

$$I_1 - I_2 = \Delta I = \frac{\Delta P_2 - \Delta P_1}{K_A} \qquad \text{Equation 4}$$

Therefore, the optimal value of gain $K_A$ may be approximated as a function of the acceptable steady-state position error ($P_{REF} - P_{FB}$) and the total current across all paralleled drives $I_{tot}(T_L)$:

$$P_{REF} - P_{FB} = \qquad \text{Equation 5}$$

$$\frac{\Delta P_1 + \Delta P_2 + K_A(I_1 + I_2)}{2} = \frac{\Delta P_1 + \Delta P_2 + K_A \cdot I_{tot}(T_L)}{2}$$

$$K_A = \frac{2 \cdot (P_{REF} - P_{FB}) - \Delta P_1 - \Delta P_2}{I_{tot}(T_L)} \qquad \text{Equation 6}$$

The largest value of the total current $I_{tot}(T_L)$ and of the position errors needs to be considered for sizing $K_A$:

$$K_{Amax} = \frac{2 \cdot (P_{REF} - P_{FB}) + 2 \cdot \Delta P_{max}}{I_{tot}^{max}} \qquad \text{Equation 7}$$

Substituting $K_{Amax}$ in the current imbalance equation provides a general relation between position measurement errors, current imbalance and the position control error in steady state operation.

$$\Delta I = \frac{(\Delta P_2 - \Delta P_1) \cdot I_{tot}^{max}}{2 \cdot (P_{REF} - P_{FB}) + 2 \cdot \Delta P_{max}} \qquad \text{Equation 8}$$

It should be noted that the above equations are approximate because the real current is affected by ripple at PWM frequency. Therefore, the equations can be used to provide a first approximation of the gain KA and the corresponding current imbalance ΔI. Detailed simulations may be used to further tune the gain and analyze the resulting current imbalance.

Figure 7:
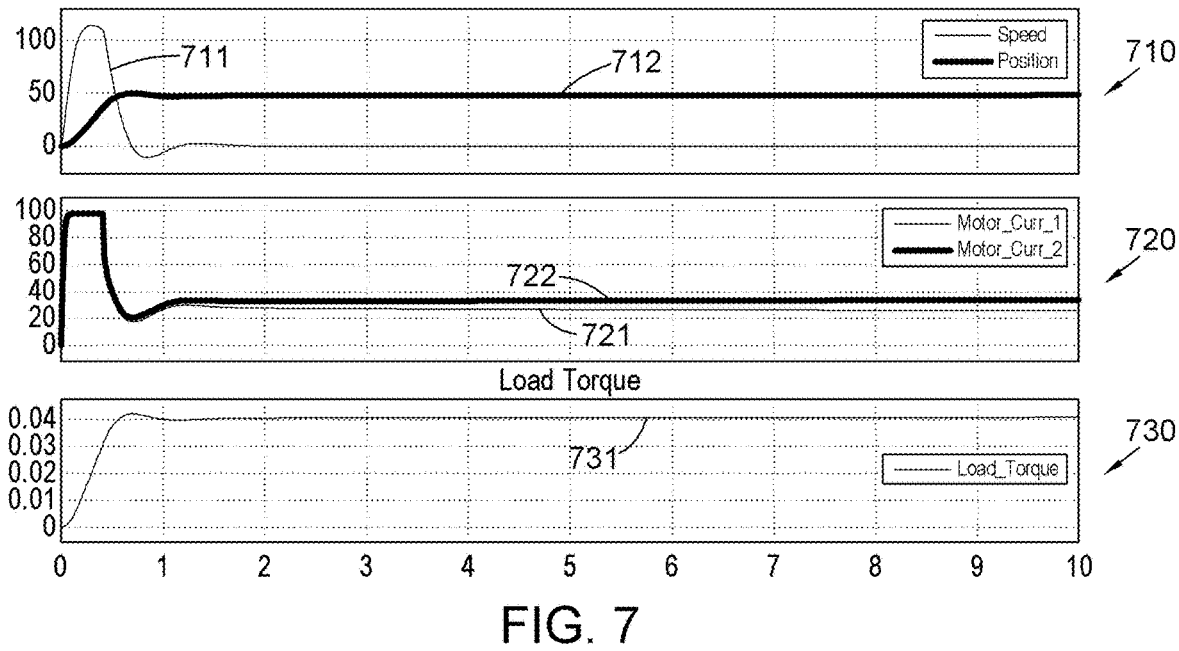
FIG. 7 is a graph showing the results of a simulation of the operation of the system of FIG. 1, wherein the paralleled motor drives utilise a linear discharge function from the modified control loop of FIG. 6.

FIG. 7 shows a simulation of the current demand response of the system of FIG. 1, but where each motor drive utilizes a control loop as seen in FIG. 6, in the case Kb and Kc are set to zero. Therefore, in this case, only a linear discharge function is applied. Similar to the simulation illustrated in FIG. 2B (which utilizes a control loop based only on a simple position error calculation), the reference position is equivalent to 50 rad (7.95 motor turns) while the measurement difference is 0.5 rad (1% of the reference value). Each graph is plotted against time on the x axis. At time t=0, the reference position is input into the system.

Graph 710 shows a plot of the speed of the mechanical speed 711 and position 712 of the actuator against time. As can be seen, in response to the position demand, the speed 711 rapidly increases, resulting in a change of position 712. When the desired position is reached, speed reaches to zero, and the actuator remains in position.

Graph 720 shows a plot of the current demand 721 of motor drive 121, and the current demand 722 of motor drive 122 over time. As can be seen, in contrast to the example of FIG. 2B, once the position of the actuator has settled at (or at least near) the reference position, the current demands 721, 722 remain constant, and do not drift apart.

Graph 730 shows a plot of the resulting load torque 731. As can be seen, this settles at a steady state (like the position of the actuator).

The linear discharge function may result in current imbalances. For instance, the parameters summarized in Table 1 below correspond to the simulation in FIG. 7.

TABLE 1

| | | | | | | | |
|---|---|---|---|---|---|---|---|
| | | | The effect of a linear function | | | | |
| $P_{REF}$ | $\Delta P_2$ | $\Delta P1$ | $(P_{REF}-P_{FB})_{MAX}$ | $I_{tot}{}^{max}$ | $K_A$ | $\Delta I_{max}$ | |
| 50 rad | 0.5 rad | 0 rad | 2 rad | 60A | 0.065 | 8A | |

As can be seen, the current imbalance between the two motors is 8 A. However, as can be seen in FIG. 7, when a linear discharge function is utilised the current imbalance remains constant, and does not drift apart. This presents several benefits over control based on a simple error, where the current imbalance cannot be controlled, without the addition of further intercommunication methods.

Quadratic Discharge Function

If only a linear discharge gain is used (e.g. if $K_a$ and $K_c$ are set to zero), the discharge function 610 becomes:

$$\text{Disc}(I)=K_b \cdot I \cdot I \qquad \text{Equation 9}$$

The current imbalance can therefore be lowered by a quadratic discharge function:

$$\begin{cases} P_{REF} - P_{FB} - \Delta P_1 - K_B \cdot I_1^2 = 0 \\ P_{REF} - P_{FB} - \Delta P_2 - K_B \cdot I_2^2 = 0 \end{cases} \qquad \text{Equation 10}$$

In this case, the current imbalance is:

$$I_1 - I_2 = \Delta I = \frac{\Delta P_2 - \Delta P_1}{K_B \cdot (I_1 + I_2)} \qquad \text{Equation 11}$$

As can be seen here, the current imbalance reduces in magnitude with an increase in current demand. Conversely, if the current demand is low, then the current imbalance actually increases. With the above, the position error can therefore be calculated as the following:

$$P_{REF} - P_{FB} = \frac{\Delta P_1 + \Delta P_2 + K_B \cdot (I_1^2 + I_2^2)}{2} = \qquad \text{Equation 12}$$

$$\frac{\Delta P_1 + \Delta P_2 + K_B \cdot \left[ \frac{I_{tot}{}^{max^2}}{2} + \frac{\Delta I^2}{2} \right]}{2}$$

$$K_B = \frac{4 \cdot (P_{REF} - P_{FB}) - 2 \cdot (\Delta P_1 + \Delta P_2)}{I_{tot}(T_L)^2 + \Delta I^2} \qquad \text{Equation 13}$$

$$K_{Bmax} = \frac{4 \cdot (P_{REF} - P_{FB}) + 2 \cdot \Delta P_{max}}{I_{tot}{}^{max^2} + \Delta I^2} \qquad \text{Equation 14}$$

These equations are more complex than the equivalent equations for the linear discharge function. Even the initial estimate of the gain $K_B$ is dependent on an assumed initial value of the current imbalance. It is also possible to assume that $\Delta I=0$ when calculating the first estimate of gain KB because the imbalance will be much smaller than the total load current.

$$K_{Bmax} \approx \frac{4 \cdot (P_{REF} - P_{FB}) + 2 \cdot \Delta P_{max}}{I_{tot}{}^{max^2}} \qquad \text{Equation 15}$$

-continued $$\Delta I \approx \frac{(\Delta P_2 - \Delta P_1) \cdot I_{tot}{}^{max}}{4 \cdot (P_{REF} - P_{FB}) + 2 \cdot \Delta P_{max}} \qquad \text{Equation 16}$$

In examples with the same parameters as those of FIGS. 2B and 7 outlined above, the approximate current imbalance is lower than the equivalent imbalance associated with a linear discharge function (and the current imbalance does not diverge, as they do with no discharge function). As before, the discharge gain $K_B$ may be further tuned using a detailed simulation of the paralleled system.

The same position measurement errors require a smaller quadratic gain $K_B$ as shown in the table below, and the resulting current imbalance is much smaller than in the previous simulation with only a linear gain, as can be seen in Table 2. The associated simulation results are presented in FIG. 8, where like reference numerals to those in FIG. 7 indicate like features.

TABLE 2

| | | | | | | |
|---|---|---|---|---|---|---|
| | | | The effect of a quadratic funtion | | | |
| $P_{REF}$ | $\Delta P_2$ | $\Delta P_1$ | $(P_{REF}-P_{FB})_{MAX}$ | $I_{tot}{}^{max}$ | $K_B$ | $\Delta I_{max}$ |
| 50 rad | 0.5 rad | 0 rad | 2 rad | 60A | 0.0025 | 3A |

Cubic Discharge Function

If only a quadratic discharge gain is used (e.g. if $K_A$ and $K_B$ are set to zero), the discharge function 610 becomes:

$$\text{Disc}(I)=K_C \cdot I \cdot I^2 \qquad \text{Equation 17}$$

The current imbalance can therefore be lowered further by a cubic discharge function:

$$\begin{cases} P_{REF} - P_{FB} - \Delta P_1 - K_C \cdot I_1^3 = 0 \\ P_{REF} - P_{FB} - \Delta P_2 - K_C \cdot I_2^3 = 0 \end{cases} \qquad \text{Equation 18}$$

In this case, a similar process may be followed as is detailed above, to result in the following current imbalance for a cubic discharge function:

$$I_1 - I_2 = \Delta I = \frac{\Delta P_2 - \Delta P_1}{K_C \cdot (I_1^2 + I_1 \cdot I_2 + I_2^2)} \qquad \text{Equation 19}$$

And therefore, the approximate optimal value of gain $K_C$ can be calculated as follows:

$$K_{Cmax} \approx \frac{8 \cdot (P_{REF} - P_{FB}) + 4 \cdot \Delta P_{max}}{I_{tot}{}^{max^3}} \qquad \text{Equation 20}$$

After fine tuning the gain $K_C$ through simulations, the resulting current imbalance is reduced to 2 A as shown in the table below (again, sharing the same parameters as the simulations detailed above, yet with a cubic discharge function) and illustrated in FIG. 9.

TABLE 3

| | | | The effect of a cubic function | | | |
|---|---|---|---|---|---|---|
| $P_{REF}$ | $\Delta P_1$ | $\Delta P_2$ | $(P_{REF}-P_{FB})_{MAX}$ | $I_{tot}^{max}$ | $K_C$ | $\Delta I_{max}$ |
| 50 rad | 0.5 rad | 0 rad | 2 rad | 60A | 0.0001 | 2A |

As can be seen from the above, in high total motor current/high torque applications, the higher the power of the feedback function (e.g. feedback functions with a cubic function/quadratic function, or potentially higher power functions), the lower the steady state torque imbalance.

By providing motor control that utilises current demand feedback as described above, not only is normal, steady state operation improved, but the system may also naturally recover following a transient fault, such as the one shown in FIG. 3.

The scenario simulated in FIG. 3 is simulated and analysed again in FIG. 10 (for a linear discharge function), FIG. 11 (for a quadratic discharge function) and FIG. 12 (for a cubic discharge function), with like reference numerals designating like features to that of FIG. 4. One of the two motors detects a fault and it is temporarily disabled and re-enabled. The two motor currents regain balance for all three types of discharge functions. However, the length of the rebalancing transient is different. The cubic discharge function achieves balance faster than the quadratic function which achieves balance faster than the linear function.

The current imbalance equation, Equation 4, that applicable to linear discharge functions indicates that the imbalance is dependent on the feedback measurement accuracy, but not on the total current of the paralleled drives. However, Equation 11 and Equation 19 indicate that current imbalance will be larger at low motor current when quadratic or cubic discharge functions are used. This effect is illustrated in FIG. 13 (which results in the details seen in Table 4) where the steady-state current imbalance is 15 A for the same quadratic discharge function as the one in FIG. 8 which was only 3 A where the total current was four times larger.

TABLE 4

| | | | the effect of a quadratic function at low currents | | | |
|---|---|---|---|---|---|---|
| $P_{REF}$ | $\Delta P_1$ | $\Delta P_2$ | $(P_{REF}-P_{FB})_{MAX}$ | $I_{tot}^{max}$ | $K_A$ | $K_B$ | $\Delta I_{max}$ |
| 50 rad | 0.5 rad | 0 rad | 0.5 rad | 15A | 0.0 | 0.0025 | 15A |

Therefore, it may be said that linear discharge functions are more effective at low motor current while quadratic and cubic functions are more effective at high motor currents.

In order to improve performance across a wide range of motor torques, a combination of linear and higher order functions may be provided. As such, in the example of FIG. 6, the gains KA, KB, KC may be tuned together to minimize simultaneously both position error and current imbalance at all torque levels. An example is illustrated in FIG. 14 and FIG. 15 where a combined linear and quadratic discharge function is used. FIG. 14 shows such a control utilised in low torque operation, and FIG. 15 shows a high torque operation.

The low torque current imbalance in FIG. 14 is better than the purely quadratic function in FIG. 13. At the same time, the high torque result in FIG. 15 is better than the purely linear function in FIG. 7.

With any of the above feedback loops, linear, quadratic, or cubic, if there exists an imbalance in the current demands produced by each motor drive 121, 122, the motor drive which has a larger current demand discharges at a faster rate than the drive with the lower demand. Therefore, as the calculated discharge is subtracted directly from the position error that drives the respective PI controllers of the motor drives, the PI controller of the motor drive with the larger current demand will see a lower absolute position error, and therefore comparatively reduce its current demand. Similarly, the PI controller of the motor drive with the lower current demand would see a comparatively higher position error, owing to the smaller discharge term, and therefore increase its current demand compared to the other motor drive.

Therefore, rather than providing any direct communication between the motor drives 121, 122, such a control loop provides indirect communication via the position error itself that drives the PI controllers of the motor drives.

The net effect is that the current demands in the two drives do not diverge (and can indeed become more balanced), without explicit communication between the two drives (and therefore without another potential point of failure in the system).

This invention is applicable to mechanically paralleled drive systems operating in position control mode such as actuators for flight control surfaces, variable engine vane actuators, etc. The control algorithm can achieve balanced torque production between motors without the need for intercommunication between the electrical drives. This simplifies the hardware configuration and improves reliability by reducing the number of single points of failure in the paralleled system. Additionally, the proposed control can be applied in cases where there are two to N paralleled motors.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A system comprising;
a mechanical load; and
a first electrical motor and associated motor drive and a
second electrical motor and associated motor drive, the first electrical motor and the second electrical motor being configured to drive the mechanical load in parallel;

wherein each electrical motor and associated motor drive have a respective position sensor configured to measure the output position of the mechanical load; and wherein each motor drive comprises a respective controller configured to output a current demand for its associated motor based on a position error between a desired output position of the mechanical load and the measured output position of the mechanical load from its respective position sensor, and a feedback signal of its output current demand;

wherein the feedback signal comprises either a cubic function of the output current demand or a quadratic function of the output current demand.

2. The system of claim 1, wherein the mechanical load is a rotary actuator or a linear actuator.

3. The system of claim 1, wherein each motor drive further comprises means for varying the feedback signal.

4. The system of claim 1, further comprising:

at least a third electrical motor and associated motor drive configured to drive the mechanical load in parallel with the first and second electrical motors.

5. The system of claim 1, wherein each electrical motor and associated motor drive are configured to drive the mechanical load via a gearbox, or where each electrical motor shares a common output shaft.

6. A method for outputting a current demand to drive an electrical motor of paralleled electric motors driving a mechanical load, the method comprising:

receiving a desired position output of the mechanical load;

measuring the actual position output of the mechanical load;

calculating a position error between the desired position output of the motor and the measured position output of the motor; and outputting a current demand to drive the motor based on a position error between the desired position of the mechanical load and the measured position of the mechanical load, and a feedback signal of the output current demand;

wherein the feedback signal comprises either a cubic function of the output current demand or a quadratic function of the output current demand.

7. The method of claim 6, wherein the mechanical load is a rotary actuator or a linear actuator.

8. The method of claim 6, further comprising varying the feedback signal.

9. The method of claim 6, wherein each motor is configured to drive the mechanical load via a gearbox, or where the first and second electrical motors share a common output shaft.

\* \* \* \* \*